United States Patent [19]
Davis et al.

[11] 3,971,708
[45] July 27, 1976

[54] ELECTROCOATING PROCESS

[75] Inventors: Gerald G. Davis, Cooksville; Joan M. Keough, St. Johns, both of Canada

[73] Assignee: SCM Corporation, Cleveland, Ohio

[22] Filed: July 8, 1971

[21] Appl. No.: 160,753

[52] U.S. Cl. ............................................. 204/181
[51] Int. Cl.² ................... C25D 13/06; C25D 13/16
[58] Field of Search ................................... 204/181

[56] References Cited
UNITED STATES PATENTS

| | | | |
|---|---|---|---|
| 3,355,373 | 11/1967 | Brewer et al. | 204/181 |
| 3,434,952 | 3/1969 | Tsou | 204/181 |
| 3,585,172 | 6/1971 | Nishiyama et al. | 204/181 |
| 3,627,720 | 12/1971 | Hinton et al. | 204/181 |
| 3,657,384 | 4/1972 | Yoshida et al. | 204/181 |

*Primary Examiner*—Howard S. Williams
*Attorney, Agent, or Firm*—Merton H. Douthitt; James B. Wilkens

[57] ABSTRACT

Advantageously controlled paint film flow during curing of the film at elevated temperature for avoidance of inadequately coated areas is obtained in an electrocoating operation of an electrode workpiece employing as paint vehicle a mixture of electrodepositable resin and water-dispersible aminoplast or phenoplast resin crosslinkable therewith by incorporating into said vehicle, or into the bath containing same, a small proportion of curing accelerator acid such as a sulfonic acid which is codepositable with said paint film in concentration sufficient for yielding a substantially continuous cured film on the resulting coated substrate. The degree of cure of the deposited coating is monitored by monitoring a property of cured coating which is a function of the degree of cure, and the concentration of the curing accelerator in the bath is adjusted in response thereto to maintain the monitored property at a predetermined value.

12 Claims, 1 Drawing Figure

ELECTROCOATING PROCESS

This invention relates to improvements in electrocoating processes and compositions, especially to such processes and compositions adapted for continuous electrocoating of strip, strap, foil or wire with a paint film, and particularly to such process and composition wherein the film contains little or no pigmentation.

The electrodeposition of acidic organic resinous materials onto an electrode workpiece under the influence of net unidirectional current to form a paint film and the elevated temperature curing of such deposited film is well established practice. Typical disclosures of this practice are included in Canadian Patent Nos. 723,706; 723,709 and 816,058, in pending Canadian Patent Application S.N. 031,738 of Oct. 4, 1968, and in U.S. Pat. No. 3,230,162.

In electrocoating practice frequently it is desirable to use as the paint vehicle a mixture of anodic or cathodic electrodepositable resinous vehicle together with water-dispersible resin which is crosslinkable with said electrodepositable resin upon heat curing, the water-dispersible resin being an aminoplast or a phenoplast resin such as shown in British Patent 665,195.

When paint containing such vehicle is continuously electrocoated onto a substrate such as a metal strip, strap, foil, ribbon or wire and force-cured by baking, flow of the paint film during the baking and resulting crosslinking frequently causes the deposit to withdraw partially or completely from substrate areas, especially from the edges and boundaries of thin sheet or foil. The resulting imperfections ("holidays") in coating are particularly evident when such coated stock is to be used for making electrical apparatus where electrical insulation of the substrate stock is of paramount importance. Such phenomena are most frequently observed when there is little or no pigmentation, finely divided metal, filler in the paint (collectively "pigmentation") and, during the cure, defects appear because of flow and sag propensities of the film.

We have now found a practical way to control paint film flow during such curing at elevated temperature in such electrocoating operation wherein the paint vehicle is a mixture of electrodepositable resin and water-dispersible aminoplast or phenoplast resin crosslinkable therewith. Essentially this control is achieved by incorporating into the paint a small proportion of curing acceleraor acid, i.e., a catalyst, which is codepositable with the paint film in low concentration sufficient for yielding a substantially continuous cured film practically free of holdays on the resulting coated substrate.

Thus, by judicious proportioning of such curing accelerator acid, one can achieve the desired delicate flow control of the coating during its curing at elevated temperature without having to resort to inclusion of particulate pigmentation, possible loss of paint adhesion to substrates (such as to aluminum which can occur with some pigments). Other benefits are that the cure is accelerated for reducing the size of the curing ovens and/or the time or temperature necessary in the oven for a given operation, thereby providing for lower investment or improved efficiency in the scheduling of the coating operation.

We are aware that attempts have been made in the past to adjust the replacement feed to an electrocoating bath in accordance with changes in the coating formed on the workpiece. One such method is proposed in U.S. Pat. 3,355,373 wherein various properties of the coating film are monitored for the purpose of replenishing the bath. This patent does not disclose the codeposition of electrodepositable resins together with aminoplast and phenoplast crosslinking resins. Moreover, the patent does not disclose the catalysis of crosslinking resins of any type.

The proportion of curing accelerator acid in the bath under conditions of continuous electrocoating is maintained by monitoring one or more properties of the cured paint film which are dependent upon the concentration of curing accelerator in the bath and adjusting the accelerator concentration in the bath accordingly. Several properties of cured paint film that are dependent of concentration of curing accelerator in the bath are dielectric breakdown voltage (or dielectric strength), film hardness and solvent resistance. Minimum performance specifications are established for one or more of these coating properties and the selected property of the cured paint film is monitored either continuously or intermittently such as in 15-, 30- or 60-minute time intervals during paint deposition and curing. The replenishment rate of curing accelerator to the electrocoating bath is then regulated in response to keeping the monitored property above the predetermined minimum value and within the range of performance specifications.

One aspect of our invention is an improvement in process for electrocoating an electrode workpiece by anodic deposition of a paint film thereon from an aqueous bath containing a dispersion of base, anodic resin and water-dispersed resin which is cross-linkable with said anodic resin upon curing, said water-dispersed resin being an aminoplast or phenoplast resins, and cure of said paint films at elevated temperature; this improvement comprises dispersing into said bath a curing accelerator codepositable with said paint film and having pKa not substantially above about 1, said curing accelerator acid being present in a proportion sufficient for codepositing with said resins in a concentration which yields a substantially continuous cured paint film on the substrate being coated and controlling the proportion of curing acid accelerator in the bath so as to maintain minimum performance specifications in the cured film.

Another aspect of our invention is a method for replenishing a liquor electrocoating bath by blending a paint concentrate into the bath for anodic or cathodic electrocoating of a substrate with a paint film, said concentrate containing an anodic resin and water-dispersible resin which is crosslinkable with said anodic or cathodic resin upon curing, said water-dispersible resin being an aminoplast or phenoplast resin; this improvement comprises including in said concentration a curing accelerator acid codepositable with said paint film and having pKa not substantially above about 1, said curing accelerator acid being present in a proportion sufficient for codepositing with said resin to yield a substantially continuous cured paint film on the substrate coated in the resultant bath.

Yet another aspect of the invention is the improvement in a process for electrocoating an electrode workpiece by cathodic deposition of a paint film thereon from an aqueous bath containing a dispersion of acid, cationic resin and water-dispersible resin which is crosslinkable with said cationic resin upon curing, said water-dispersible resin being aminoplast or phenoplast resin and cure of said paint film at elevated temperatures; this improvement comprising dispersing into said bath a curing accelerator acid codepositable with said paint film and having a pKa not substantially above about 1, said curing accelerator being present in a proportion for codepositing with said resins in a substantially continuously cured paint film on the substrate being coated. The proportion of curing in accelerator in the bath is controlled by monitoring a property of the cured paint which is a function of the degree of cure, and adjusting the concentration of curing accelerator in the bath to maintain the property of the cured paint film above a predetermined minimum value or within a predetermined range of performance values.

The properties of the cured film which are usually monitored to determine if the coating is properly cured are dielectric strength (or breakdown voltage), film hardness, abrasion resistance and solvent resistance. Test procedures and equipment for such tests are well known in the art.

The term "breakdown voltage" or "dielectric breakdown voltage" refers to the voltage level at the point where the paint film on an electrically conductive surface conducts electrical current. Usually a current of not more than 10 milliamperes is sufficient to complete the circuit. The breakdown voltage for any given coating film of a given thickness and of the type used herein will depend upon the degree of cure. Most properly cured paint films of this type disclosed herein have a minimum breakdown voltage of about 500 volts per mil of thickness.

In testing for breakdown voltage, the workpiece having a cured coating on one side thereof, is contacted with a first aluminum foil electrode having a thickness of 0.002 inches. The electrode is held in intimate contact with the cured coating. A second aluminum foil electrode is attached in like manner to the uncoated surface of the workpiece. Voltage is applied across the electrodes by a transformer having a rating of 500 volts per ampere or greater and providing an essentially undistorted sinusodial wave form under test condtions. The frequency of the alternating current applied is 60 cycles per second ± 10%. In testing the paint film, the voltage initially is applied at zero voltage; and there is increased uniformity to breakdown voltage at a rate such that the miniumum breakdown voltage specified will be reached in about 5 seconds for the particular film thickness under test. A suitable dielectric testing apparatus is sold by Research and Developing Testing Laboratories as Dielectric Tester Model MW-2.

Another slightly different method for determining breakdown voltage which is suitable for the present purposes is ASTM test D-495-61 which is incorporated by reference. These dielectric testing procedures can be performed intermittently on selected samples of stock. If desired these test procedures can be adapted for continuously monitoring of the cured coating by using rotary electrodes and rotary thickness gauges. The curing accelerator concentration in the electrocoating bath is then adjusted either manually or automatically (as by means of a control cell-control valve arrangement) to adjust the concentration of curing and accelerator in the bath.

Another property of the cured coating film that is directly related to the degree of curing for any given coating composition is the solvent resistance test. In this test, the cured coating film is manually or mechanically rubbed with a cloth saturated with solvent such as methyl ethyl ketone; and the test rating is a number of "rubs" (each rub being one forward and one backward rubbing motion) necessary to remove or soften the coating. The test rating is as follows:

| Rating | Rubs | Observation |
| --- | --- | --- |
| 10 | 200 | No marking |
| 8 | 200 | Moderate marking |
| 6 | 150–200 | Through to metal |
| 4 | 50–150 | Through to metal |
| 2 | 10–50 | Through to metal |
| 0 | 10 | Through to metal |

For most coating applications, the minimum performance rating for solvent resistance will be 4. This solvent resistance test can be performed intermittently or continuously to test portions of the workpiece and the curing accelerator concentration in the bath is regulated manually or automatically to maintain the solvent resistance test at a rating of about 4 or higher.

Another property of the cured coating film that is directly related to the degree of curing for any given coating is the film hardness test. In this test, the film hardness is tested in terms of indentation of penetration by calibrated stylus. Suitable test methods are described in the ASTM test D-1474-68, the disclosure of which is incorporated by reference. Suitable testing apparatus for film hardness is available from several sources such as Tukon Microhardness tester Models FB and MD, and Riehle Kentron Microhardness tester Model AK. Another hardness test is the simple pencil hardness where the coating hardness indentation hardness is measured in terms of indentations made by pencils of various hardnesses such as F, B, H, 2H, 3H and so on.

The hardness test for the cured coating film can be performed intermittently or continuously to test portions of the workpiece, and the curing accelerator concentration in the bath is regulated manually or automatically to maintain the coating hardness test above about a predetermined minimum value. For most any coating of the present inventon, the pencil hardness rating is at least about H.

Another coating property related to degree of cure is the abrasion test where the cured film is abraded with a standardized abrading apparatus. For any good coating composition, the abrasion resistance will increase as the degree of cure increases. Other properties in the cured coating film which can be monitored are apparent to those skilled in the art.

Figure 1:
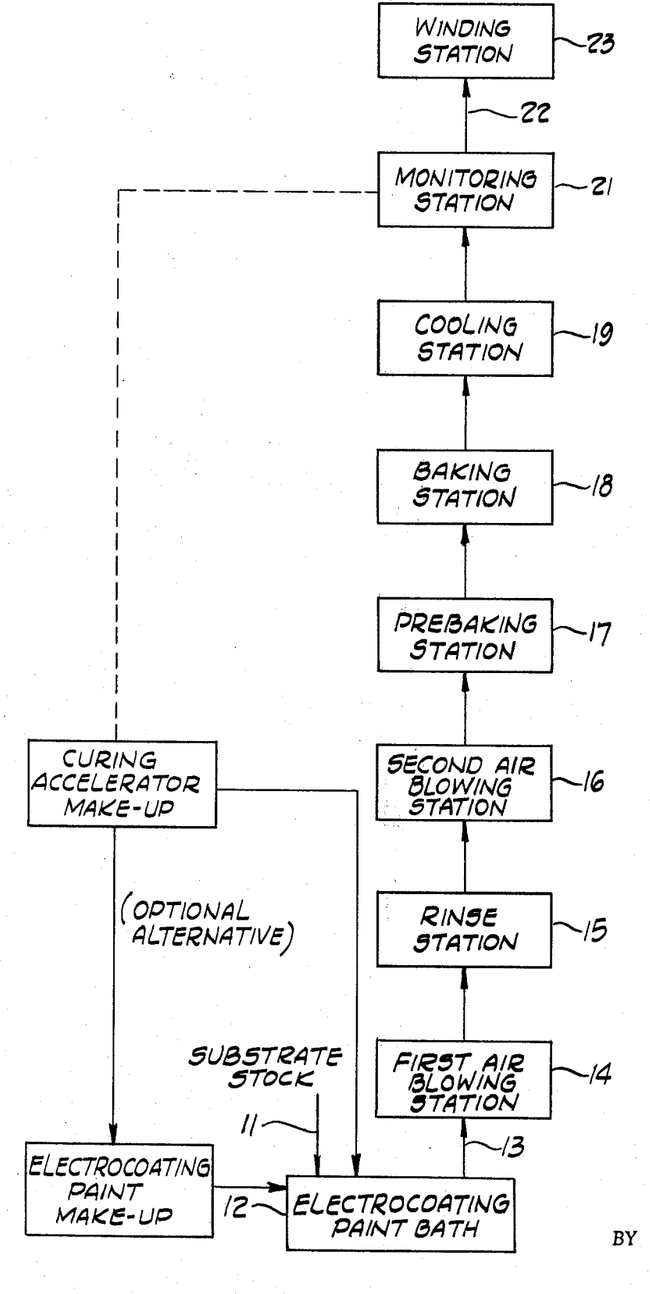

The drawing is a process flow diagram showing how our process can be adapted to the continuous coating of a substrate stock such as aluminum or steel, strip, foil, strap, ribbon or wire. Substrate stock 11, suitably pretreated, is fed continuously into electrocoating paint bath 12 and therein a wet paint film is electrodeposited on the stock. Wet coated stock 13 is withdrawn from electrocoating paint bath 12 continuously, blown with air in a first air blowing station 14 to remove adhering droplets, then rinsed with an aqueous spray, if desired, to give a more perfect finish in rinse station 15, then air blown again in a second air blowing station 16 to remove adhering aqueous droplets.

The stock then passes continuously into prebaking station 17, typically maintained at 150° to 200°F. to remove solvent and other volatile matter, and in some cases to initiate cure of the paint, suitably in the presence of a flow of air to remove volatiles. The stock then passes continuously into baking station 18, suitably a natural or forced convention oven operated at a temperature in the range of 300° to 800°F., typically in the range of 500° to 700°F. and preferably at 650°F. It emerges continuously from the baking station 18 and passes into cooling station 19, suitably an air cooling unit designed to cool the cured stock thus eliminating blocking. These rather high temperatures (up to 800°F. and preferably about 500° to 700°F.) are maintained in the baking station 18 to provide sufficient temperature gradient so that the coating will achieve a curing temperature of about 300° to 500°F. when the coated stock is passed through the baking station 18 so rapidly that the coated stock is not heated to the temperature in the baking station. If the coated substrate were allowed to remain in the baking station for a longer period of time, the temperature in the baking station could be lowered. The important factor to consider in selecting the temperature in the baking station is that the curing reaction is a time-temperature reaction, and lower temperatures require relatively longer time periods to affect the same degree of cure at a given curing accelerator concentration. Once thermal equilibrium has been achieved, the degree of cure is dependent on the concentration of curing accelerator.

The cooled stock then emerges from the cooling station 19 in a tack-free condition and passed into a monitoring station 21 continuously, wherein the monitoring apparatus (suitably thickness gauging means and rolls or other tactile electrode sensors having an electric potential therebetween) tests the thickness and tests the dielectric strength of the resulting cured coating to determine its continuity on various surfaces of the coated substrate. The curing accelerator make-up to the electrocoating paint bath is then either manually or automatically adjusted so that the monitored property is above a predetermined minimum. Alternatively, the curing accelerator make-up can be added to the electrocoating paint make-up.

From the monitoring station 21 coated stock 22 passes continuously to a take-up or drawing mechanism, suitably wound on spools or reels at winding station 23. An accumulator can be used at this stage to provide for uninterrupted operation in take-up or winder of the coated stock. A principal function of the processing sequence after the application of wet electrodeposited paint is to cure such paint without substantially marring its surface. All processing apparatus from start to finish in the above-described process can be conventional and are available. For prolonged continuous electrocoating operation, the bath components are replenished as they are removed from the bath. This is done by determining what has been removed from the bath during the coating operation and making up that which has been removed.

In the broad sense the term "paint" as used herein can include finely divided pigment or filler or metal flake or powder in electrodepositable cationic or anionic resin/phenoplast or aminoplast crosslinking resin which can be tinted if desired by dyes, and a coating composition which upon curing is converted into a water-resistant film broadly analogous to an enamel, a varnish, a lacquer, a primer or the like.

The cationic or anionic resin is a water-dispersible, non-gelled, polymeric material carrying an ionic charge, or more precisely, either an anionic or cationic charge. This resin must, in addition to the aforementioned charge characteristic, also contain one or more reactive sites selected from carboxyl groups, alcoholic hydroxyl groups and amido groups in order to crosslink with the phenoplast or aminoplast resin. If the resin contains carboxyl groups, it will be anionic but it will be capable of being converted to a cationic material by amination or by use of a cationic surfactant, which material will inherently be carrying with it the crosslinking sites for the aminoplast or phenoplast compound. On the other hand, if the cationic or anionic resin is devoid of any carboxyl groups, but does contain alcoholic hydroxyl groups and/or amido groups, said resin will be non-ionic but can be converted to an anionic material by carboxylation. By the same token, if the resinous vehicle is devoid of any carboxyl groups but containing alcoholic hydroxyl groups and/or amido groups were to be prepared, such material again, as before, would contain the necessary crosslinking sites but would, nevertheless be a non-ionic polymeric material. If desired, such a non-ionic resinous vehicle can be converted to a cationic polymeric material by amination of the polymeric material with, for example, a primary, secondary or tertiary amine compound, a quaternary ammonium compound and the like.

In the cationic or anionic resin the amount of carboxyl groups and/or alcoholic hydroxyl groups and/or amide groups should be at least 1% by weight and not greater than 30% by weight of the resin. Preferably, one would use between 5 and 20% by weight based on the total weight of the resin of the carboxyl-containing monomer and/or the alcoholic hydroxyl-containing monomer or the amide-containing monomer. These percentages by weight prevail whether the individual monomer-containing carboxyl groups, alcoholic hydroxyl groups or amide groups are the sole reactive groups present or whether they are present in any of the above combinations.

The anionic resins can be any one of a plurality of polymeric materials which have reactive sites that are heat reactive with the aminoplast or phenoplast resin compounds. These reactive sites can be carboxyl groups and/or alcoholic hydroxyl groups and/or amido groups, which resins are the result, e.g., of vinyl polymerization or epoxy polymerization, or are polyesters or maleinized oils. These polymeric materials can be completely water soluble or they can be substantially water insoluble but capable of being dispersed in water. Sometimes it may be necessary to use appropriate surfactants to disperse these polymeric materials. The term "water dispersible", therefore, is intended to encompass both the aqueous solutions as well as dispersions in which the resin vehicle be suspended in the aqueous medium. These anionic resins can contain as the sole reactive sites carboxyl groups of alcoholic hydroxyl groups or amide groups or they can, in fact, contain all three.

If the polyester resins used contain preponderant amounts of the polycarboxylic acid, such polyester should be reacted until an acid number of not less than 30 is reached and preferably to an acid number of between 45 and 70. If the polyester resin is prepared by using a preponderance of alcoholic hydroxyl groups, the ingredients forming the polyester should be selected to give a ratio of OH to COOH equivalents of not less than 1.10, and preferably between 1.15 and 1.30.

The anionic resins generally useful for our purpose are film forming at the electrodeposition bath temperature and are heat curable with the aminoplast or phenoplast resin to yield a tack-free film. Such acidic resins include polycarboxylic acid resins such as coupled siccative oils, e.g., coupled glyceride drying or semidrying oils such as sunflower, safflower, perilla, linseed, hempseed, walnut seed, dehydrated castor oil, rapeseed, tomato seed, menhaden, corn, tung, soya, oiticica or the like, the olefinic double bonds in the oil being conjugated or nonconjugated or a mixture, the coupling agent being an acyclic olefinic acid or anhydride, preferably maleic anhydride, but also crotonic acid, citraconic acid, or anhydride, fumaric acid or even a polybasic acid such as phthalic or succinic, particularly coupled glyceride oils that are further reacted with about 2 to 25% of a polymerizable vinyl monomer; maleinized unsaturated fatty acids; maleinized rosin acids, alkyd resins, e.g., the esterification products of a polyol or epoxide with a polybasic acid or anhydride, particularly glyceride drying oil-extended alkyd resins; acidic hydrocarbon drying oil polymers such as those made from maleinized copolymers of butadiene and diisobutylene; diphenolic acid and like polymer resins; resins made from the reaction of trimellitic anhydride with a polyol optionally modified with other acids such as acrylic acid; resins made from the reaction of epoxides, polycarboxylic acids or anhydrides, and drying oil fatty acids; and acrylic and vinyl polymers and copolymers having carboxylic acid groups such as butyl acrylate-methyl methacrylate-methacrylic acid copolymers, vinyl acetate-acrylic acid copolymers, acrylic acid and lower alkyl ($C_{1-4}$) substituted acrylic acid-containing polymers, i.e., those having carboxyl groups contributed by alpha, beta unsaturated carboxylic acids or residues of these acids, etc.

Such acidic resins can be modified and extended in various ways. Thus, blending of thermoplastic non-heat reactive phenolic resin into certain polycarboxylic acid resins and heating for about one half hour and preferably for about 1 to 2 hours or more at a temperature between about 200°C. and about 260°C. appears to give a chemical bonding between these components. Other extender resins include hydrocarbon resins such as coumarone-indene resins and diolefinic petroleum resins such as those of essentially naphthenic structure which are heat reactive, e.g., cyclopentadiene resins. Furthermore, the acid resins can be modified by reaction with alkyleneamine or substituted alkyleneamine such as ethyleneimene, propyleneimine, benzl ethyl amine as in U.S. Pat. No. 3,494,847, the disclosure of which is incorporated by reference.

Many other resinous extenders and film plasticizers of conventional nature can be incorporated into the electrocoating bath dispersion. For example, butadiene-styrene latices, vinyl chloride and vinylidene chloride homopolymer and copolymer latices, polyethylene resins, flurocarbon resins, bis phenolglycidyl either resins, dicyclo diepoxy carboxylate resins, finely divided thermoplastic solids such as polyvinyl chloride, polystyrene, etc., are permissible, also provided, however, that the proportion of such extenders is not so high as to interfere with desired electrodeposition characteristics or flow control during the cure.

The bases useful as dispersal assistants in the anodic resin in the aqueous bath include ammonium hydroxide and amino compounds such as monoamine, polyamines and hydroxyamines, potassium hydroxide, sodium hydroxide, and the like. Non-volatile bases are generally less preferred than the amine bases for the present service because their possible inclusion into a paint film renders the film more water sensitive. Typical amine bases useful here include diisopropanolamine, monethanolamine, diethanolamine, triethanolamine and mono- di- and triethylamine.

The cationic resins used in the present invention can be any one of a plurality of polymeric materials which have reactive sites that are heat reative sites with the phenoplast and aminoplast. As in the anionic resins, these reactive sites may be either carboxyl groups and-/or alcoholic hydroxyl groups and/or amide groups, which polymeric materials may be the result of vinyl polymerization. Therefore, all of the polymerizable monomers in each of these three principal classes can be used to prepare the cationic polymeric materials used in the present invention. Still further, these polymerizable monomers may be used with other polymerizable monomers such as the esters, styrenes, nitriles and the like. These cationic resins can be broadly described as being selected from any one of the following classes: Acrylic polymers, of which a substantial variety are vinyl and acrylic monomers and can be copolymerized with amino acrylates and methacrylates such as dimethylaminoethyl methacrylate, diethylaminomethyl acrylate, and diethylaminoethyl acrylate, and the like. These polymers can be dissolved or dispersed in water with the addition of a waterdispersible acid. It must be kept in mind that these polymers should also contain some —OH and/or —COOH and/or groups which can be obtained by copolymerizing vinyl monomers with comparatively small amounts of such polymerizable monomers as hydroxylethyl methacrylate and/or acrylic acid or acrylamide. For efficiency and economy, the cationic resin is an aminoalkanol ester. Such aminoalkanol esters include tertiary aminoalkanol esters having at least about 0.05 grams equivalent of ionizable tertiary amino nitrogen per 100 grams. To be especially readily dispersible in water with a strong acid, the ester advantageously should have at least about 0.1 gram equivalent whereby aqueous dispersions can be established and maintained homogeneously with little or no mechanical mixing. If, however, hydroxylated substances are incorporated into the ester structure, e.g., a hydroxylated alkyl acrylate or methacrylate, or into the bath e.g., 2-alkoxy ethanol-1 glycols, monoalkyl ethers of diethylene glycol, etc., stable aqueous dispersions can be maintained at slightly lower levels of ionizable tertiary amino nitrogen in the ester.

The preferred cationic resins have at least about 0.05 grams equivalent of ionizable tertiary amino nitrogen per 100 grams, said ester being selected from the group consisting of the reaction product of a preformed polycarboxylic acid polymer with a tertiary amino alkanol; the reaction product of a polycarboxylic acid with a tertiary amino alkanol having a plurality of esterifiable hydroxyl groups; a vinyl copolymer having in its structure methylol acrylamide units and units formed by esterifying an α, β-unsaturated carboxylic acid monomer with a tertiary amino alkanol; and a vinyl polymer containing in its structure free hydroxyl groups and units formed esterifying and α, β-unsaturated carboxylic acid monomer with a tertiary amino alkanol such as disclosed in U.S. application Ser. No. 662,866 filed Aug. 24, 1967, the disclosure of which is incorporated by reference. Still other types of suitable cathodically deposited vehicles are described in U.S. Pats. 3,466,723; 3,454,482 and 3,455,806.

The cationic resins can also be modified and extended in various ways. Thus, they can be blended with other resinous or plasticizing materials for codeposition, such as butadiene latices, vinyl chloride and vinylidene chloride homopolymer and copolymer latices, polyolefin resins, flurocarbon resins, bisphenol glycidyl ether resins, dicyclodiepoxy carboxylate resins, diolefinic petroleum resin dispersions, resinous polyol and resinous polyols esterified with carboxylic acids such as monocarboxylic acids, film plasticizers such as dioctylphthalate and the like.

Those that are normally solid at dispersion temperature but readily fusible, including dicyclodiepoxy carboxylate resins, polyethylene resins, polyvinyl chloride resins, powdered chlorinated hydrocarbon waxes, epichlorohydrin-bisphenol type epoxy resins advantageously having molecular weight of about 1,000 or higher to resist hydrolysis in the bath, chlorinated rubber, vinyl acetate-vinyl chloride copolymers, and mixtures of same can be melted and coalesced with the ester in a force curing temperature of 300° to 400°F. Also appropriate for codeposition in connection with the preformed polycarboxylic acid polymers below, said acid resins being, for codeposition, dissolved in the polymeric ester with or without the use of auxiliary organic solvent such as 2-butoxy ethanol-1, methyl ethyl ketone, a normally liquid hydrocarbon customarily used as a paint thinner, etc.

The water-dispersible aminoplast or phenoplast resin crosslinkable with the anionic or cationic resin in straight or extended state can be selected from a number of types. The term "aminoplast resins" as used herein refers to hydroxyl functional, heat hardenable condensation products of amines, especially triazines with an aldehyde, such as formaldehyde. Condensation products of urea, melamine, aniline, ammeline, guanidine, dicyandiamidine, benzoguanamine with aldehydes such as formaldehyde acrolein and butyraldehyde are typical aminoplast resins of which the benzoguanamine-formaldehyde resins are preferred. Such types include conventional aminoplasts made with substituted as well as straight benzoguanamine, melamine and urea and other aldehydes than formaldehydes. The condensation reaction product can be further etherified by reacting the methylol groups in part or in whole with alcohols such as butyl alcohol, methyl alcohol and propyl alcohol to achieve specific properties. Furthermore, aminoplast resins also include products obtained by addition polymerization with ethylenically unsaturated monomer having active amino groups in its molecule such as acrylamide or with other unsaturated monomers such as styrene, divinyl benzene, methacrylic acid and by addition of aldehyde to its amino group to form a methylol group and products obtained by etherifying the methanol groups as above described with alcohols.

The term "phenoplast resin" as used herein refers to the hydroxyl functional heat hardenable condensation products of phenols and substituted phenols (e.g., alkyl, aryl halide hydroxyl substition) with aldehydes such as formaldehydes, acetaldehyde, butyraldehyde, chloral, furfuraldehyde and acrolein. Condensation products of phenol, cresols, xylenols, resorcinol with formaldehyde are typical.

All of these useful crosslinkers have some measure of hydroxyl functionality on them which renders them water dispersible, but not actually soluble in water to give a clear solution. Generally the weight proportions of resinous vehicle to aminoplast or phenoplast resin used is between about 9:1 and about 2:1, advantageously between about 5.7:1 and about 4:1. Useful aminoplasts and phenoplast resins are on general sale, for example, "XM 1125", "XM 1123", "XM 1116", so designated and sold by American Cyanamid Company, and "Bakelite CKR-5254"and "CKR-0405" produced by Union Carbide Corporation under the trademark "Bakelite".

When such resins are dispersed in water at 80°F to the extent of 35% by weight, a stable aqueous dispersion can be filtered out through a silicious filter aid on paper to return the water vehicle without appreciable resin therein. Similar resins which are water soluble to the extent of as little as 25% and below in water at 80°F do not electrodeposit as efficiently but are nevertheless useful for the present purposes.

A typical phenoplast resin of the type useful here is made by reacting formaldehyde and phenol in the ratio of 1.0 to 2.0 mols of the aldehyde per mol of phenol. A typical benzoguanamine resin for use here is made by reacting benzoguanamine and formaldehyde in the ratio of 1 mol of benzoguanamine per 3 mols of formaldehyde and alkylated with an alkanol, for example, 3 mols of butanol. A typical melamine resin for use here is made by reacting melamine and formaldehyde in the ratio of 1 to 6 mols of the aldehyde per mol of melamine, then alkylating with 3 to 6 mols methanol or other alkanols. A typical urea resin for use here is made by reacting urea and formaldehyde in the ratio of 1 to 2 mols of the aldehyde per mol of urea.

The curing accelerator acid is one whose pKa in water at 20°C is not substantially above about 1 and generally between about 0 and about 1. If more than one hydrogen is available on such acid, the first pKa is the governing one concerned here. If the pKa of the curing accelerator acid is substantially in excess of 1, the cure is usually impractically slow and too much curing accelerator acid needs to be used in the bath and codeposited with the paint film. If insufficient of the curing accelerator is used, there is too much flow; and holidays or withdrawal (typically from edges) occurs. On the other hand, if too much curing accelerator acid is incorporated in the bath and transfers into the film, the crosslinking reaction occurs to yield too little flow; and the film generally loses continuity and has pinholes. Generally desired thicknesses of the cured film is between about one-half to 2 mils.

The curing accelerator acid or catalyst should in general be dispersible in the aqueous bath to a concentration of at least about 0.5%. Preferably the curing accelerator acids are dispersible to a concentration of 1% by weight or more to insure efficient mixing and lyophilic enough to transport itself in the electrical field of the bath with the resinous ingredients regardless of any individual charge the accelerator itself might exhibit. While it can be added, for example, as a component sorbed on finely divided clay or the like, it is preferable that the curing accelerator acid becomes homogeneous with the resin film suitably by going into a colloid micelle of the resin by itself or with assistance of a small proportion of a solvent or so-called "cosolvent" such as isopropanol, 2-butoxy ethanol-1, or the like which has both hydrophilic and lipophilic properties.

Advantageously the curing accelerator acids are organic acids so as to become homogeneous accelerators or catalysts in the wet film (which contains a small amount of occluded water), although other acidic materials such as mineral acids, if transportable to codeposit in the film, also conceivable as curing accelerators in the practice of this invention.

The generally preferred curing accelerator acids are organic acids such as sulfonic acids (including sulfonates). Suitable curing accelerator acids include alkyl sulfonates, aryl sulfonates, alkyl sulfates, aryl sulfates, their respective salts, sulfonic and sulfated fatty esters, sulfonated and sulfated oils and fatty acids, alcohol sulfates, benzene, xylene and toluene sulfonates, naphthalene sulfates, dodecyl and tridecyl benzene sulfonates and petroleum sulfonates, sulfonic acids, for example, paratoluene sulfonic acid, dodecyl benzene sulfonic acid, methylarsonic acid, benzosulfonic acid, naphthalenesulfonic acid, picric acid, trichloroacetic acid, trifluoroacetic acid and phenyl-sulfonic acid. In general, such acids are used in a concentration in the bath between about 0.01 and about 1 meq. and preferably between about 0.05 to about 0.3 on resin solids present and, in the paint concentrate, in about one half of the concentration.

A preferred method for direct operation is to monitor the dielectric strength, suitably at one or more regions of the cured coated substrate in a monitoring zone remote from the bath and to adjust the proportion of the curing accelerator in the bath responsive to establishing and maintaining the monitored dielectric strength measurement or measurements at or above predetermined value by addition of more or less curing accelerator acid feed to the bath, which acid can be fed by itself to the bath or incorporated in a mixture of other feeds such as the paint concentrate, or as a combination of bath such ways.

Another way of controlling the proportion of the curing accelerator in the bath is to establish and maintain the desired proportion in the bath in response to analysis of the curing accelerator acid concentration in the bath at a level known to give the desired result, that is a substantially continuous cured film without substantial holidays or other discontinuities. Thus, for example, one can analyze for sulfur by conventional methods when a sulfonic acid curing accelerator acid is used and no other sulfur is present in the bath that would interfere with such analysis so as to make it nonindicative of the sulfonic acid concentration sought. Alternatively, the sulfur or phosphorus or other identifiable group or element in the acid can be measured in some cases by colorimentry with a chromophore and the use of UV spectrophotometry. Alternatively, also, an atom of the curing accelerator acid, or some portion of it, can be tagged radioactively so that concentration present can be measured with an appropriate sensor.

Ordinarily the electrodeposition of the paint onto the substrate will be done by immersing such substrate, charged as an electrode, into a reservoir of aqueous paint dispersion constituting the bath. However, this also can be done by spraying the bath dispersion on the electrode substrate, provided that the spray makes a continuous stream which carries the necessary electric current in the manner of a shower bath as distinguished from a tub bath. Dipping of the electrode substrate into the bath is preferred for efficiency and economy.

The voltage between the electrode substrate and the reference electrode, which can be the bath vessel itself or one or more electrode members inserted into the bath vessel, ordinarily is at least about 50 and preferably 100 to 300 volts and can even be higher, provided it does not destabilize the paint dispersion or "burn" spots in the deposited film, e.g., 500 volts or more. Lower voltages can be used, of course, to deposit a resinous film but these are generally less efficient. The deposition time and voltage are regulated generally to get the desirable thickness of film for example one fifth mil or more. Typical deposition times in the bath are from a second to as much as several minutes if necessary or desired. For continuous, high speed work the immersion time usually is measured in seconds or even fractions thereof. The resinous films are tacky before curing, but they have sufficient water resistance to permit rinsing with a water, as by a spray of water, to remove drips, surface bubbles, and the like.

Ordinarily the electric current used for the electrodeposition is d.c. current, usually a rectified a.c. current having about 5 to 15% ripple factor. However, the current can have a greater or lesser ripple factor, or even can be half wave rectified alternating current, and so on, provided the net effect is unidirectional, and thus, such current can be considered direct. The current can even be pulsed with interruptions, or even reversed for short intervals periodically, so that the net resultant effect is a direct current electrodeposition.

Concentration of the resin solids in the bath can be as low as about ½% and up to about 35% by weight, advantageously being between about 3 and 20% and preferably between about 5 and 15% for efficiency and economy. Such solids content of the bath is determined in standard manner for determining non-volatile material (ASTM method D-1644 of 1959). Any pigmentation added, of course, will add to the foregoing solids content provided by the resins and other non-volatile materials in the bath.

The temperature of the bath ordinarily is maintained between about 60° and about 110°F., although higher and lower bath temperatures can be tolerated in some cases. The preferred bath temperature is between about 70° and 100°F. for general efficiency.

Final curing of the electrodeposited film is done in an oven or stove maintained at a temperature up to about 700°F. Typical curing cycles are 300° to 600°F. for a minute or so up to about 10 minutes. Heat curing can be assisted in some instances by ionizing radiation. One or more ovens can be used if desired to stage the cure. The seemingly high oven temperature of the curing cycle is required in some instances, particularly high line speeds to attain peak substrate temperatures in the range of 300° to 450°F. which are required to effect curing. It is possible where thin films (e.g., 0.2 to 0.4 mils) are involved to eliminate the thermal gradient between the oven and the substrate. Such thin films in some cases can be introduced directly without the precure heat treatment into curing ovens at 300° to 600°F. without deleterious effect to the cured film.

The substrate suitable for the process, of course, must be electrically conductive and generally is metal or metallized paper or the like. Aluminum metal is a prime stock for this process. Rolled steel, galvanized iron or steel, and extra low carbon steels are others. Frequently mild rolled sheet steels are pretreated conventionally with phosphate and chromate treatments, but such treatments need not be used in this process.

Metal such as aluminum is best cleansed preparatory to its electrocoating using acids or caustic soda followed by appropriate rinsing, or even cleansed by use of organic solvents such as normally liquid hydrocarbon solvents or trichlorethylene. Typical cleansing treatments include the use of such organic solvents, electrolytic caustic treatment and desirably, final washing with deionized water to remove spray electrolytes.

Thin sheet substrate stock typically is slit from a strip, and one or more of the resulting strips are fed into the bath continuously. If the slitted stock needs to be deburred at the edges, this is done. The speed of the line in a continuous operation suitably is adjusted in response to maintaining desired thickness and/or dielectric strength dependent on such thickness of the cured coating. Draw of the stock through the processing line is adjusted in speed to yield the desired characteristics. Correlative with such adjustment, the voltage differential in the electrocoating bath can be adjusted to vary the deposition characteristics such as deposit thickness, and the temperature profile of the oven can also be varied to accelerate or decelerate cure and flow of the electrodeposited paint. All of this, of course, in addition to the regulation of the proportion of curing accelerator acid in the bath to yield optimum characteristics for a particular installation. The continuous operation can be shut down, or in some cases slowed with adjustment of the variables periodically to change feed and/or wind-up reels or other collectors. Alternatively, the continuous operation need not be interrupted if conventional machinery for joining the feed and accumulating or changing collection is utilized.

The following examples show ways in which our invention can be practiced, but should not be construed as limiting the invention. Unless otherwise specified all temperatures herein are in degrees Fahrenheit, all percentages are weight percentages, and all parts are parts by weight.

EXAMPLE 1

A blend of 84 parts of acidic resin and 16 parts of aminoplast is made in a mixer at 150°F., both resins being mixed in 2-butoxy ethanol-1 for the purpose. The acidic resin is a maleinized reaction product of linseed oil fatty acids which oil previously had been reacted with a bisphenol-A epichlorohydrin condensation product. Such epoxide condensation product has epoxide equivalent of 425 to 550 and molecular weight of 900 to 1100. The resulting acidic resin has, based on weight of linseed oil fatty acids, 47% of said epoxide condensation product, 13.6% maleic anhydride equivalent and 17.9% of 2-ethoxy ethanol-1 solvent, an NVM of 90 to 95%, weight per gallon of 8.4 pounds, Acid Number on its non-volatile portion of 45 to 55, and viscosity at 25°C., (when reduced to 60% solids in 2-butoxy ethanol-1) of T-W (Gardner-Holdt). The aminoplast is a solution in 2-butoxy ethanol-1 of benzoguanamine-formaldehyde resin sold by American Cyanamid under the trademark "XM 1125" partially etherified with lower alkanol. It is dispersible in water but will not dissolve in water to yield a clear solution; it has weight per gallon of 8.33 pounds, 85% solids content and viscosity at 25°C. of $Z_5$ to $Z_7$ (Gardner-Holdt).

The resin blend formed above is then dosed with 0.1 milliequivalent weight of paratoluene sulfonic acid per gram of resin, the paratoluene sulfonic acid being added as a 25% by weight solution in isopropanol. To the resulting concentrate is added 13.5 parts of diisopropanol amine solution (85% in water) with continued mixing, and sufficient water is added to reduce the blend to 35% by weight solids concentration to form a paint concentrate. This paint concentrate is then used for forming electrocoating baths like those described in the following examples. To replenish such baths, a similar replenishment concentrate is formed using 0.05 milliequivalent weight of paratoluene sulfonic acid per gram of resin and 10.8 parts of the diisopropanol solution. This proportion of paratoluene sulfonic acid is determined by dielectric testing of the resulting cured coating film as explained in Example 2.

EXAMPLE 2

An electrocoating bath is made by diluting the paint concentration of Example 1 with water to yield a bath having 12% solids (non-volatile materials) concentration. An aluminum workpiece 10 inches wide, 0.010 inches thick and 10 inches long is immersed to a depth of 8 inches in the electrocoating bath, the metal container of which is wired as a direct current cathode while the aluminum workpiece is wired as a direct current anode in an electrocoating circuit. After immersion, the d.c. voltage between the anode and the cathode is maintained at about 140 volts and temperature of the electrocoating bath is about 80°F.

The workpiece is electrocoated for 30 seconds after which time the power is turned off. The wet, coated workpiece is then blown with air, rinsed with water and further blown with air, then cured for 10 minutes in a prebaking oven set at 200°F, then baked for 10 minutes in a baking oven at 400°F to completely cure the coating.

The coated product is air-cooled and has a substantially uniform coating about 1 mil thick which is for all practical purposes continuous on all portions of the workpiece which have been dipped into the electrocoating bath. Dielectric testing on the edge portions of the coated workpiece shows a breakdown voltage of more than 1,000 volts, indicating also excellent continuity of the cured film on the broad faces or sides.

The aluminum strip is then fed continuously to the bath, and the electrodeposition is carried out continuously as described above with reference to the drawing. The bath components are replenished to make-up the components removed in the coating film. Dielectric testing of the edge portions and broad surface portions of the coated and cured workpiece is performed at 30-minute intervals, and the paratoluene acid is added to the bath in a proportion sufficient to maintain the breakdown voltage at the edge portion thereof above about 800 volts per mil. This proportion of paratoluene sulfonic acid used in replenishing the bath is the amount required to maintain the breakdown voltage at the edge portion of the coated and cured workpiece above about 800 volts per mil. Similar results can be obtained by replenishing the paratoluene sulfonic acid in the bath in a proportion sufficient to maintain the pencil hardness of the cured film above about 2H by intermittent hardness testing.

Similar results are obtained using the following resinous vehicles and crosslinking aminoplasts in the foregoing continuous electrocoating procedure:

a. A low molecular weight polyimide-amide resin condensed from 1.0 moles of paraphenylene diamine and 2.0 moles of trimellitic anhydride is dispersed in water with diisopropanolamine and a benzoguanamine-formaldehyde aminoplast resin (XM 1125 sold by American Cyanamid) in the proportion of 15 parts aminoplast per 85 parts of polyimide-amide resin to give a bath having 10% by weight of resinous non-volatile matter;

b. A polyimide resin made by condensing 1 mole of pyromellitic dianhydride with 1 mole of xylylene dimethylamine dispersed in water with diisopropanolamine and benzoguanamineformaldehyde resin (XM 1125) in the proportion of 15 parts aminoplast per 85 parts polyimide to give a bath having 10% by weight of resinous non-volatile matter; and c. A linear polyester is made by condensing pyromellitic drianhydride, 2 moles, with trimethylol ethane, 1 mole, neopentyl glycol, 6 moles, and isophthalic acid, 2 moles, and dispersed in water with monoisopropanolamine and benzoquanamineformaldehyde resin.

EXAMPLE 3

A wet, coated workpiece is continuously electrocoated with continuous bath replenishment as described in Example 2 using the process described with respect to the drawing. The workpiece is then passed at a speed of 23 feet per minute through a multizone oven having a length of 15 feet from the workpiece entrance to workpiece exit. The temperature profile in the oven is as follows:

| Distance from Entrance (Feet) | Temperature (°F) |
| --- | --- |
| 0 | 180 |
| 2 | 190 |
| 4 | 270 |
| 6 | 400 |
| 8 | 640 |
| 10 | 760 |
| 12 | 770 |
| 14 | 770 |
| 15 | 770 |

The resulting coated workpiece has a substantially uniform continuous coat of about 1.5 mils in thickness. Dielectric testing on the edge portions of the coated workpiece shows a breakdown voltage of 1400 volts (when measured by ASTM D495-61 for High-Voltage, Low Current, Arc Resistance of Solid Electrical Insulating Materials) indicating excellent edge continuity of the cured film. Intermittent dielectric testing of the broad surfaces of the workpiece shows a breakdown voltage of about 2300 volts indicating excellent film continuity of the cured coating. The paratoluene sulfonic acid is replenished to the bath in a proportion sufficient to maintain the breakdown voltage of the edge portion at about 1000 volts per mil. This proportion is about 0.1 meq. of paratoluene sulfonic acid per gram of total resin.

For continuous dielectric monitoring, pairs of rolls or other sensing devices which measure dielectric strength of the thin edges of the strip call for additional curing accelerator acid in the bath when such dielectric strength drops below the limiting value.

EXAMPLE 4

A. An electrocoating concentrate similar to the one described in Example 1, but having 0.085 meq. paratoluene sulfonic acid per 1.0 gram of total resin is prepared and diluted with water to 12% solids (NVM) to form an electrocoating bath. An aluminum panel 4 inches wide, 0.023 inches thick and 10 inches long is immersed to a depth of 5 inches in the electrocoating bath, the container of which is wired as a direct current cathode, while the aluminum panel is wired as a direct current anode, the voltage being maintained at 40 volts.

The temperature of the bath is 80°F. Immersion and removal of the workpiece is made with power off. The power is turned on and the workpiece is left for an immersion time of 15 seconds from the start of power on to power off. The wet, coated workpiece then is rinsed with water, then cured for 90 seconds in an oven operated at 535°F. The coated product has a substantially uniform coating which is 0.2 mils thick. The resultant film has a pencil hardness of greater than "H" and a solvent resistance rating of about 4.

When no paratoluene sulfonic acid is present in the bath, the resultant film after curing at 535°F for 90 seconds is undercured and has a pencil hardness of B and a solvent resistance rating of 0, although the coating could be cured to a solvent resistance rating of 4 and a pencil hardness of greater than H at 535°F for 6 minutes.

Thus, the presence of the curing acid accelerator increases the rate of cure significantly. This procedure is performed to determine what concentration of paratoluene sulfonic acid will provide adequate film hardness and solvent resistance in the cured film.

B. An aluminum strip is then continuously electrocoated with bath replenishment as described above with respect to the drawing, and the coating is cured for 90 seconds at 535°F. The hardness of the cured coating is monitored intermittently, and the concentration of paratoluene sulfonic acid is maintained to sustain the pencil hardness of the cured film above about H. Similar results are obtained utilizing benzosulfonic acid, naphthalenesulfonic acid, picric acid or trichloroacetic acid as the curing acid accelerators.

EXAMPLE 5

The electrocoating procedures of Part A of Example 4 are repeated except that the cure schedule is fixed at 400°F for 10 minutes. The cured coating film on the workpiece from the bath containing the cure accelerator has more complete cure than the cured coating film on the workpiece coated from the bath containing no cure accelerator, as judged by repeated scrape abrasion results on a General Electric Repeated Scrape Abrasion Tester. In this test, a No. 15 piano wire bearing a weight of 200 grams is moved back and forth across the coated surface of the contoured workpiece which has been deformed on a ⅛ inches mandrel, and the number of passes to wear through the metal is determined as the point of failure. The dry film thickness on each workpiece is 1.3 mils, and the cured film containing the curing accelerator failed after 650 passes while the cured film containing no curing accelerator failed after 100 passes.

An aluminum strip is then continuously electrocoated with electrocoating bath replenishment as described in Example 4, Part B, except that the bath is replenished with paratoluene sulfonic acid in an amount sufficient to maintain the scrape abrasion test rating of the resulting cured film above about 400 passes.

EXAMPLE 6

An electrocoat material for cathodic deposition is prepared as follows To 85 parts of the esterification product of dimerized linseed fatty acids (having an acid number of about 190) with dimethylethanolamine, said ester having an acid number of about 26, is blended 15 parts of benzoguanamine resin aminoplast (XM 1125) and about 5 parts of a catalyst solution (a 25% by weight solution of p-toluene sulfonic acid in isopropanol). To this blend is added, with agitation 250 grams of a 10% by weight aqueous solution of phosphoric acid. The neutralized ester solution is then diluted with deionized water to give an aqueous bath having 7¼% resinous solid to form the cathodic electrolyte.

A 1.0 mil film of the resinous ester material is deposited on a steel strip by making the latter the cathode in the electrolytic bath and applying a d.c. voltage of 120 volts for 45 seconds at 80°F. The coating is cured at a temperature of 400°F. for 10 minutes to provide a cured film having a dielectric breakdown voltage of 1,000 volts/mil. To achieve a dielectric breakdown voltage in the absence of the curing accelerator, a curing time period of 20 minutes at 400°F. is required.

The steel strip connected as the cathode in the electrocoating circuit is continuously electrocoated with bath replenishment, and the coating is cured for 6 minutes at 400°F. The dielectric breakdown voltage of the cured film is monitored at 15-minute intervals, and the concentration of the paratoluene sulfonic acid is maintained to sustain the dielectric breakdown voltage of the cured film at about 1,000 volts/mil.

EXAMPLE 7

A cationic resin is made by reacting 25 parts of styrene, 50 parts of butyl acrylate, and 10 parts of hydroxylpropyl methacrylic acid and 15 parts of dimethylaminoethyl methacrylate in the presence of 20 parts of 2-butoxyethanol-1 and 2.5 parts of dicumyl peroxide catalyst. The cationic resin is dispersed in water with an equal weight of 10% aqueous phosphoric acid then further reduced with water to obtain a resin concentration of 5%. Sufficient hexamethoxymethyl-melamine resin (Cymel 300 sold by American Cyanamid) is blended to give a resin concentration of 8%. A steel strip connected as the cathode in the electrocoating circuit is then continuously electrocoated with bath replenishment. The coating is cured for 90 seconds at 535°F. The dielectric breakdown voltage of the cured film is monitored at 30-minute intervals, and the concentration of the paratoluene sulfonic acid is maintained to sustain the dielectric breakdown voltage of the cured film above about 1,000 volts/mil.

EXAMPLE 8

The procedure of Example 7 is repeated except that the cationic resinous vehicle is prepared by reacting one mole of dehydrated castor oil acids, 4 moles of triethanolamine and 3 moles of phthalic anhydride to an acid number of 12. Upon continuous electrocoating and replenishment similar results are obtained by replenishing the paratoluene sulfonic acid in a proportion to maintain the dielectric breakdown voltage above about 500 volts/mil.

EXAMPLE 9

A cationic resin is prepared by reacting 2 parts of N-vinylimidazole and 25 parts of N-2-Oxahexylamide of acrylic acid and 30 parts of 2-ethoxyhexyl ester of acrylic acid, 20 parts of styrene and 5 parts of 4-hydroxylbutyl ester of acrylic acid in 100 parts of butanol. This cationic resinous vehicle is blended with one half the weight of a phenoplast resin made by reacting 1.5 moles of formaldehyde with one mole of phenol. The resin blend is then diluted to 10% resin concentration and adjusted to a pH of 3.5 with hydrochloric acid.

An aluminum workpiece is connected as the cathode in the electrocoating circuit and continuously electrocoated with bath replenishment and curing of the coating at 535°F for 90 seconds. Benzosulfonic acid curing accelerator is added to the electrocoating bath in a proportion to maintain the dielectric breakdown voltage at about 1000 volts/mil. This proportion corresponds to about 0.1 meq. of benzosulfonic acid per total gram of resin in the bath.

EXAMPLE 10

A cationic resin is prepared by reacting N-vinylimidazole, 5 parts of acrylamide, 30 parts of N-butyl acrylate and 35 parts of t-butyl acrylate and 10 parts of 4-hydroxybutyl acrylate dissolved in 100 parts of isobutanol. The cationic resin is dispersed in water with 0.95 moles of acetic acid per mole of the N-vinylimidazole. The resin dispersion is mixed with an 85% butyl cellosolve solution of a water-dispersible benzoguanamine formaldehyde resin (XM 1125 sold by American Cyanamid) in the ratio of 85 parts of cationic resinous vehicle to 15 parts of benzoguanamine-formaldehyde resin. The resin dispersion is then adjusted to 10% resin concentration with water.

A steel workpiece is then connected as the cathode in an electrocoating circuit and continuously electrocoated with bath replenishment while the coating is cured for 10 minutes at 400°F. Paratoluene sulfonic acid is added to the bath in an amount sufficient to maintain the pencil hardness of the cured film above about H.

Having thus described the invention, what is claimed is:

1. In a continuous process for coating continuous electrode stock by electrodeposition of a paint film thereon from an aqueous bath containing a dispersion of cationic or anionic resinous vehicle, a dispersant for said resinous vehicle and a water-dispersible resin which is crosslinkable with said resinous vehicle upon curing, said water-dispersible resin being an aminoplast or phenoplast resin, wherein wet coated electrode stock is withdrawn continuously from said bath and force cured to make finished coated stock, the improvement for regulating flow of the freshly electrodeposited film before and during said force curing and thereby continuously producing finished coated stock virtually free from defects related to said flow which comprises:

establishing in said bath a dispersion of curing accelerator acid codepositable with said resinous vehicle, the pKa of said acid being not substantially above about 1 and the proportion of said acid being about that for yielding a substantially continuous cured film;

monitoring completeness of the resulting coating on the finished coated stock; and, in response to said monitoring, adjusting concentration of said acid in said bath adequately for maintaining substantially completely coated finished coated stock output.

2. The process of claim 1 wherein said electrode stock is the anode, said resinous vehicle is an anodic resin and said dispersant is a base.

3. The process of claim 1 wherein said electrode stock is the cathode, said resinous vehicle is a cathodic resin and said dispersant is an acid.

4. The process of claim 1 wherein said curing accelerator acid is a sulfonic acid.

5. The process of claim 1 wherein the cured paint film is monitored for completeness of coverage by monitoring dielectric strength and the proportion of said curing accelerator acid in said bath is established and maintained to sustain the monitored dielectric strength above about 500 volts per mil of cured paint film thickness.

6. The process of claim 1 wherein said curing accelerator acid is maintained in a concentration in said bath between about 0.01 and about 1 meq. of acid per gram of total resin solids present.

7. The process of claim 1 wherein the curing accelerator acid is rendered substantially homogeneous in the coating film by use of a solvent.

8. The process of claim 1 wherein said aqueous bath is replenished by paint concentrate containing said curing accelerator acid.

9. The process of claim 1 wherein said cationic or anionic resinous vehicle contains about 1 to 30% by weight of carboxyl groups, alcoholic hydroxyl groups, amide groups and mixtures thereof.

10. The process of claim 1 wherein said aminoplast resin is a water-dispersible condensation reaction product of an aldehyde with urea, melamine, aniline, ammidine, guanidine, dicyandiamide or benzoguanamine.

11. The process of claim 1 wherein said phenoplast resin is a water-dispersible condensation product of an aldehyde with a phenol or substituted phenol.

12. The process of claim 1 wherein the weight proportion of cationic or anionic resinous vehicle to aminoplast or phenoplast resin is between about 9:1 and about 2:1.

* * * * *